July 31, 1951

H. J. WOOD 2,562,684

PNEUMATIC FOLLOW-UP PRESSURE REGULATOR

Filed July 24, 1944

Inventor:
HOMER J. WOOD,
By
Attorney.

Patented July 31, 1951

2,562,684

UNITED STATES PATENT OFFICE 2,562,684

PNEUMATIC FOLLOW-UP PRESSURE REGULATOR

Homer J. Wood, Los Angeles, Calif., assignor to The Garrett Corporation, Airesearch Manufacturing Company division, Los Angeles, Calif., a corporation of California Application July 24, 1944, Serial No. 546,353

17 Claims. (Cl. 98—1.5)

My invention relates to means for controlling the pressure of air in pressurized cabins of aircraft, and relates in particular to a simple control mechanism having parts responsive to absolute cabin pressure and also to the pressure differential between the cabin interior and exterior to maintain predetermined pressures in the cabin for different flight altitudes.

It is an object of the invention to provide a control device for pressurized cabins having an element which responds only to changes in pressure of the air within the aircraft cabin, and a device which responds to changes in air pressure inside and outside the cabin, with means whereby the controlling effect derived from both of these responsive elements are utilized to control the pressure of air within the cabin.

A further object of the invention is to provide a control device having a cabin pressure control valve which is opened and closed in accordance with changes in air pressure, and means whereby a flow of air under pressure is delivered to the controlling means of the air valve, this flow of air under pressure being derived from two separate sources, one of which is controlled by changes in absolute pressure within the cabin, and the other of which is controlled by changes in pressure differential between the interior and exterior of the cabin.

A further object of the invention is to provide a means for regulating pressure in an aircraft cabin having an outflow valve operated by pressure differential between the cabin and the outside atmosphere, the operation of said outflow valve being controlled by two valves disposed in parallel, one of these control valves being sensitive to cabin absolute pressure while the other is sensitive to the existing differential pressure between the cabin interior and the cabin exterior.

A further object is to provide a control device whereby pressure sensitive means are subjected to cabin pressure modulated by passage through a feeder orifice, thereby producing a pneumatically effectuated proportional control which minimizes the hunting tendency found in control devices of this general character.

A further object of the invention is to provide a control valve mechanism having air valves of simple form, the outlets of which are connected to the air chamber of the main cabin air valve, and the inlets of which are connected to the cabin interior or selected source of air pressure through a flow controlling orifice.

Further objects and advantages of the invention will be brought out in the following part of the specification.

Referring to the drawings which are for illustrative purposes only,

Figure 1:
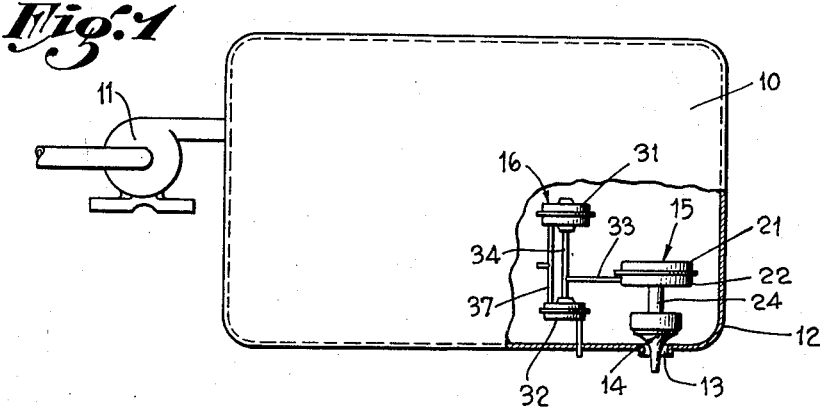
Fig. 1 is a schematic view showing a manner of use of one embodiment of my invention in an aircraft cabin.

In Fig. 1 I have shown an aircraft cabin 10 into which air under pressure is fed by a blower 11. In the wall 12 of the cabin 10 there is an air outlet opening 13 with which a valve 14 co-operates to control the rate of discharge of air from the cabin 10 in such relation to the flow of air into the cabin from the blower that predetermined pressures are maintained.

Figure 2:
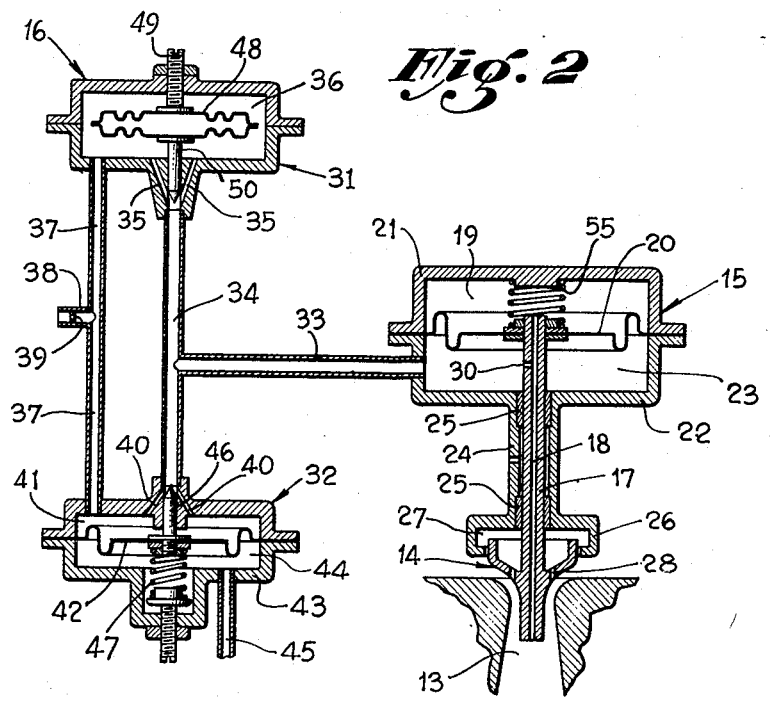
Fig. 2 is an enlarged sectional view showing the control device of Fig. 1.

A valve operating means 15 controlled by a control device 16 actuates the valve 14. As shown in Fig. 2, the valve 14 is formed upon a stem 17 having an axial opening 18 for communication of external ambient flight pressure to a chamber 19 formed on the face of a diaphragm or movable wall 20 which is far from the valve 14. This chamber 19 is formed by a shell 21 which is secured to a supporting structure 22 defining a chamber 23 on the opposite side of the movable wall 20. The structure 22 has a tubular portion 24 surrounding a portion of the stem 17 and having therein bearings 25 to support the stem 17 for axial sliding movement. At the lower end of the supporting structure 22 there is an annular wall 26 forming a chamber 27, the lower part of which is open to receive the upper part of the valve 14. In the valve there are openings 28 through which a pressure communication between the upper and lower face of the valve 14 is accomplished. The chamber 23 has an air bleed connection with the atmosphere external of the cabin, consisting of a small passage 30 in the stem 17, connecting the chamber 23 to the passage 18 which communicates with the exterior through the lower end of the stem below the valve 14.

The chamber 23 is connected with air valves 31 and 32 through ducts 33 and 34. The valve 31 has valve passages 35 which communicate through a compartment 36 with a duct 37 having an inlet 38 communicating with the interior of the cabin. The duct 37 is provided with a flow controlling orifice 39 through which cabin air may flow. The valve 32 has valve passages 40 which communicate through a chamber 41 with the duct 37. One wall of the chamber 41 is formed by a diaphragm 42 and a wall 43 is provided so as to define a chamber 44 on the side of the diaphragm 42 opposite the chamber 41, this chamber 44 communicating through a passage 45 with ambient air pressure. The diaphragm 42 is connected to a valve closure 46 which is urged by an adjustable spring 47 toward a position to close the passage 40 of the valve 32. In the compartment 36 there is an evacuated capsule or aneroid 48 supported by an adjustment screw 49 and being connected to a valve closure 50 which closes the valve passages 35 of the valve 31 in response to expansion of the aneroid 48.

In the operation of the control device, air under pressure passes through the duct 37 into the compartment 36, and the chamber 41. The pressure of this air produces collapsation of the aneroid 48 so as to open the valve passages 35 of the valve 31 in keeping with the absolute pressure of air in the cabin 10. The pressure of air in the chamber 41, derived from the cabin, and the pressure of air in the chamber 44, derived from ambient flight atmosphere, produces a pressure differential on the diaphragm 42 which moves the same downward so as to open the passages 40 of the valve 32. The flows of air from the valves 31 and 32 pass through the ducts 34 and 33 into the chamber 23 of the valve actuating unit 15. In view of the lower pressure existing in the chamber 19 under flight conditions, due to its connection through the passage 18 with ambient flight pressure, the diaphragm 20 is moved upward against the force of a spring 55 which exerts a closing movement against the upper end of the valve stem 17, the result being that the diaphragm 20 is lifted and the stem 17 transmits a lifting movement to the valve 14 so as to increase the effective size of the air outlet opening 13, in response to an increase in pressure in the cabin, and also in response to an increase in pressure differential between the cabin air and the atmospheric pressure existing outside the cabin. Also, a reduction in cabin pressure and a reduction in the differential pressure existing between cabin air and ambient flight air outside the cabin will reduce the flow of air into the chamber 23, so that there will be a reduction in pressure in the chamber 23 owing to leakage therefrom through the bleeder passage 30, with the result that there will be a closing movement of the valve 14. When a prescribed differential between cabin pressure and ambient flight pressure is reached, the differential control 32 will replace the aneroid control 31. A characteristic of the device is that pressure in the compartment 36 and in the chamber 41 is modified from cabin pressure as the result of the interposing of the orifice 39 in the path of air flow, and is less than cabin pressure, but varies in accordance with cabin pressure and also the changes in the rates of flow through the orifices 30 and 39. The following example of the mode of operation of the device refers to specific pressure ranges, but it will be understood that either or both of the isobaric and differential pressure controls can be adjusted for other cabin and ambient pressure relations. During flight at altitudes less than 8000 feet (for example) bellows 48 is compressed to hold valve 50 open to transmit pressure derived from the cabin to the underside of the diaphragm 20 to hold the valve 14 open. At the same time the valve 46 is held closed by the spring 47. When an altitude of 8000 feet is approached, the bellows 48 starts to expand to close the valve 50, tending to cut off communication of modified cabin pressure to the diaphragm 20. The spring 55 then acts to partially close the valve 14 since the pressure in the chamber 23 tends to leak to atmosphere through the passage 18. The bellows 48 and the valve 50 act to maintain cabin pressure constant until an altitude of 30,000 feet (for example) is approached. At this time the reduction in pressure in the compartment results in an expansion of the bellows 48 which will substantially close the valve 50 and modified cabin pressure acting on the upper side of the diaphragm 42 exceeds the combined force of the outside atmospheric pressure and the force of the spring 47 acting on the lower side of the diaphragm 42, and as a result, the valve 46 is opened to transmit pressure through the duct 33 to the underside of the diaphragm 20 to cause opening of the exhaust valve 14. The diaphragm 42 and the valve 46 act to maintain a constant differential of cabin pressure over atmospheric pressure for altitudes above 30,000 feet.

I claim as my invention:

1. In a control for a pressure cabin, the combination of: a wall forming a valve opening connecting the cabin interior with the exterior; a valve for said opening, said valve having a projecting stem with a passage therethrough communicating with the exterior of the cabin; a chamber member having a movable wall connected to said stem, said chamber member forming a first air chamber adjacent the face of said movable wall far from said valve and communicating with said passage, and forming a second chamber communicating with the face of said movable wall near said valve, there being a bleeder port in said stem connecting said second chamber with said passage of said stem; a pair of air valves each having its outlet connected to said second chamber and the inlet thereof connectd to a duct which communicates with the interior of the cabin through an air flow controlling orifice; means responsive to changes in absolute pressure in said cabin to actuate one of said air valves; and means responsive to changes in pressure differential between the interior and exterior of said cabin for actuating the other of said air valves, whereby the flow of air from the cabin interior into said second chamber will be determined by said air valves.

2. In a control for a pressure cabin, the combination of: a wall forming a valve opening connecting the cabin interior with the exterior; a valve for said opening, said valve having a projecting stem with a passage therethrough communicating with the exterior of the cabin; a chamber member having a movable wall connected to said stem, said chamber member forming a first air chamber adjacent the face of said movable wall far from said valve and communicating with said passage, and forming a second chamber communicating with the face of said movable wall near said valve, there being a bleeder passage connecting said second chamber with a zone of pressure lower than the pressure in said second chamber; a pair of air valves each having its outlet connected to said second chamber and the inlet thereof connected to a duct which communicates with the interior of the cabin through an air flow controlling orifice; means responsive to changes in absolute pressure in said cabin to actuate one of said air valves; and means responsive to changes in pressure of differential between the interior and exterior of said cabin for actuating the other of said air valves, whereby the flow of air from the cabin interior into said second chamber will be determined by said air valves.

3. In a control for a pressure cabin, the combination of: a wall forming a valve opening connecting the cabin interior with the exterior; a valve for said opening, said valve having a projecting stem with a passage therethrough communicating with the exterior of the cabin; a chamber member having a movable wall connected to said stem, said chamber member forming a first air chamber adjacent the face of said movable wall far from said valve and communicating with said passage, and forming a second chamber communicating with the face of said movable wall near said valve, there being a bleeder port in said stem connecting said second chamber with said passage of said stem; a pair of air valves, each having its outlet connected to said second chamber and the inlet thereof connected to the interior of the cabin; an aneroid exposed to air pressure derived from the interior of the cabin; means connecting the movable part of said aneroid to one of said air valves so as to open the same upon an increase in air pressure in the cabin; and means responsive to changes in pressure differential between the interior and exterior of said cabin for actuating the other of said air valves, whereby the flow of air from the cabin interior into said second chamber will be determined by said air valves.

4. In a control for a pressure cabin, the combination of: a wall forming a valve opening connecting the cabin interior with the exterior; a valve for said opening, said valve having a projecting stem with a passage therethrough communicating with the exterior of the cabin; a chamber member having a movable wall connected to said stem, said chamber member forming a first air chamber adjacent the face of said movable wall far from said valve and communicating with said passage, and forming a second chamber communicating with the face of said movable wall near said valve, there being a bleeder passage connecting said second chamber with a zone of pressure lower than the pressure in said second chamber; a pair of air valves, each having its outlet connected to said second chamber and the inlet thereof connected to the interior of the cabin; an aneroid exposed to air pressure derived from the interior of the cabin; means connecting the movable part of said aneroid to one of said air valves so as to open the same upon an increase in air pressure in the cabin; and means responsive to changes in pressure differential between the interior and exterior of said cabin for actuating the other of said air valves, whereby the flow of air from the cabin interior into said second chamber will be determined by said air valves.

5. In a control for a pressure cabin, the combination of: a wall forming a valve opening connecting the cabin interior with the exterior; a valve for said opening, said valve having a projecting stem with a passage therethrough communicating with the exterior of the cabin; a chamber member having a movable wall connected to said stem, said chamber member forming a first air chamber adjacent the face of said movable wall far from said valve and communicating with said passage, and forming a second chamber communicating with the face of said movable wall near said valve, there being a bleeder port in said stem connecting said second chamber with said passage of said stem; a pair of air valves, each having its outlet connected to said second chamber and the inlet thereof connected to a duct which communicates with the interior of the cabin through an air flow controlling orifice; means responsive to changes in absolute pressure in said cabin to actuate one of said air valves; a resiliently supported septum; wall means forming chambers on the opposite sides of said septum connected respectively to the interior and the exterior of said cabin; means connecting said septum to the other of said air valves whereby movement of said septum in response to an increase in air pressure differential between the interior and the exterior of said cabin will open said other air valve, whereby the flow of air from the cabin interior into said second chamber will be determined by said air valves.

6. In a control for a pressure cabin, the combination of: a wall forming a valve opening connecting the cabin interior with the exterior; a valve for said opening, said valve having a projecting stem with a passage therethrough communicating with the exterior of the cabin; a chamber member having a movable wall connected to said stem, said chamber member forming a first air chamber adjacent the face of said movable wall far from said valve and communicating with said passage, and forming a second chamber communicating with the face of said movable wall near said valve, there being a bleeder port in said stem connecting said second chamber with said passage of said stem; a pair of air valves, each having its outlet connected to said second chamber and the inlet thereof connected to the interior of the cabin; an aneroid exposed to air pressure derived from the interior of the cabin; means connecting the movable part of said aneroid to one of said air valves so as to open the same upon an increase in air pressure in the cabin; a resiliently supported septum; wall means forming chambers on the opposite sides of said septum connected respectively to the interior and the exterior of said cabin; means connecting said septum to the other of said air valves whereby movement of said septum in response to an increase in air pressure differential between the interior and the exterior of said cabin will open said other air valve, whereby the flow of air from the cabin interior into said second chamber will be determined by said air valves.

7. In a control for a pressure cabin, the combination of: a wall forming a valve opening connecting the cabin interior with the exterior; a valve for said opening, said valve having a projecting stem with a passage therethrough communicating with the exterior of the cabin; a chamber member having a movable wall connected to said stem, said chamber member forming a first air chamber adjacent the face of said movable wall far from said valve and communicating with said passage, and forming a second chamber communicating with the face of said movable wall near said valve, there being a bleeder passage connecting said second chamber with a zone of pressure lower than the pressure in said second chamber; a pair of air valves, each having its outlet connected to said second chamber and the inlet thereof connected to the interior of the cabin; an aneroid exposed to air pressure derived from the interior of the cabin; means connecting the movable part of said aneroid to one of said air valves so as to open the same upon an increase in air pressure in the cabin; a resiliently supported septum; wall means forming chambers on the opposite sides of said septum connected respectively to the interior and the exterior of said cabin; means connecting said septum to the other of said air valves whereby movement of said septum in response to an increase in air pressure differential between the interior and the exterior of said cabin will open said other air valve, whereby the flow of air from the cabin interior into said second chamber will be determined by said air valves.

8. In a control for a pressure cabin, the combination of: a wall forming a valve opening connecting the cabin interior with the exterior; a valve for said opening, said valve having a projecting stem with a passage therethrough communicating with the exterior of the cabin; a chamber member having a movable wall connected to said stem, said chamber member forming a first air chamber adjacent the face of said movable wall far from said valve and communicating with said passage, and forming a second chamber communicating with the face of said movable wall near said valve, there being a bleeder port in said stem connecting said second chamber with said passage of said stem; a pair of air valves, each having its outlet connected to said second chamber and the inlet thereof connected to the interior of the cabin; walls forming a compartment connected to the interior of the cabin through an air flow controlling orifice; an aneroid exposed to air pressure in said compartment derived from the interior of the cabin; means connecting the movable part of said aneroid to one of said air valves so as to open the same upon an increase in air pressure in the cabin; a resiliently supported septum; wall means forming chambers on the opposite sides of said septum connected respectively to the interior through an air flow controlling orifice and the exterior of said cabin through duct means; means connecting said septum to the other of said air valves whereby movement of said septum in response to an increase in air pressure differential between the interior and the exterior of said cabin will open said other air valve, whereby the flow of air from the cabin interior into said second chamber will be determined by said air valves.

9. In a control for a pressure cabin, the combination of: a wall forming a valve opening connecting the cabin interior with the exterior; a valve in said opening; means comprising a chamber to receive air under pressure, said chamber being vented to a zone of lower pressure; a second chamber connected with a zone of lower pressure; means separating said chambers and operating in response to changes in the differential of pressures in said chambers for moving said valve; a pair of air valves each having its outlet connected with the first mentioned chamber and the inlet thereof connected to a duct which communicates with the interior of the cabin through an air flow controlling orifice; means responsive to changes in absolute pressure in said cabin to actuate one of said air valves; and means responsive to changes in pressure differential between the interior and exterior of said cabin for actuating the other of said air valves, whereby the flow of air from the cabin interior into said first mentioned chamber will be determined by said air valves.

10. In a control for a pressure cabin, the combination of: a wall forming a valve opening connecting the cabin interior with the exterior; a valve for said opening; means for controlling the position of said valve, said means comprising a chamber for receiving air under pressure, said chamber being vented to a zone of lower pressure; a second chamber connected with the exterior of the cabin; means separating said chambers and operating in response to changes in the differential of pressures in said chambers to move said valve; a pair of air valves each having its outlet connected to the first mentioned chamber and the inlet thereof connected to the interior of the cabin; an aneroid exposed to air pressure derived from the interior of the cabin; means connecting the movable part of said aneroid to one of said valves so as to open the same upon an increase in air pressure in the cabin; and means responsive to changes in pressure differential between the interior and the exterior of the cabin for actuating the other of said air valves, whereby the flow of air from the cabin interior into the first mentioned chamber will be determined by said air valves.

11. In a control for a pressure cabin, the combination of: a wall forming a valve opening connecting the cabin interior with the exterior; a valve for said opening; means for controlling the position of said valve, said means comprising a chamber for receiving air under pressure, said chamber being vented to a zone of lower pressure; a second chamber connected with the exterior of the cabin; means separating said chambers and operating in response to changes in the differential of pressures in said chambers to move said valve; a pair of air valves each having its outlet connected to the first mentioned chamber and the inlet thereof connected to a duct which communicates with the interior cabin through an air flow controlling orifice; means responsive to changes in absolute pressure in said cabin to actuate one of said air valves; a resiliently supported septum; wall means forming chambers on opposite sides of said septum connected respectively to the interior and the exterior of said cabin; means connecting said septum to the other of said air valves whereby movement of said septum in response to an increase in air pressure differential between the interior and the exterior of the cabin will open said other air valve, so that the flow of air from the cabin interior into the first mentioned chamber will be determined by said air valves.

12. In a control for a pressure cabin, the combination of: a wall forming a valve opening connecting the cabin interior with the exterior; a valve for said opening; means for controlling the position of said valve, said means comprising a chamber for receiving air under pressure, said chamber being vented to a zone of lower pressure; a second chamber connected with the exterior of the cabin; means separating said chambers and operating in response to changes in the differential of pressures in said chambers to move said valve; a pair of air valves each having its outlet connected to the first mentioned chamber and the inlet thereof connected to the interior of the cabin; an aneroid exposed to air pressure derived from the interior of the cabin; means connecting the movable part of said aneroid to one of said air valves so as to open the same upon an increase in air pressure in the cabin; a resiliently supported septum; wall means forming chambers on opposite sides of said septum connected respectively to the interior and the exterior of said cabin; means connecting said septum to the other of said air valves whereby movement of said septum in response to an increase in air pressure differential between the interior and exterior of said cabin will open said other air valve so that the flow of air from the cabin interior into the first mentioned chamber will be determined by both said air valves.

13. In a control for a pressure cabin, the combination of: a wall forming a valve opening connecting the cabin interior with the exterior; a valve for said opening; means for controlling the position of said valve, said means comprising a chamber for receiving air under pressure, said chamber being vented to a zone of lower pressure; a second chamber connected with the exterior of the cabin; means separating said chambers and operating in response to changes in the differential of pressures in said chambers to move said valve; a pair of air valves each having its outlet connected to the first mentioned chamber and the inlet thereof connected to the interior of the cabin through an air flow controlling orifice; a compartment forming part of said connection; an aneroid exposed to air pressure in said compartment derived from the interior cabin; means connecting the movable part of the aneroid to one of said air valves so as to open the same upon an increase in air pressure in the cabin; a resiliently supported septum; wall means forming chambers on opposite sides of said septum connected respectively to the interior of the cabin through said air flow controlling orifice, and to the exterior of the cabin through duct means; and means connecting said septum to the other of said air valves whereby movement of said septum in response to an increase in air pressure differential between the interior and the exterior of said cabin will open said other air valve, so that the flow of air from the cabin interior into the first mentioned chamber will be determined by said air valves.

14. In mechanism for controlling the pressure within an enclosure having an opening to the exterior thereof: a control pressure chamber, a flexible diaphragm, one side of said diaphragm being subjected to the pressure in said chamber; a valve positioned adjacent said valve opening and being movable to control the flow therethrough, there being means connecting said valve and said diaphragm so that movement of said diaphragm moves said valve; wall means defining a space on the side of said diaphragm opposite said pressure chamber and having a connection to atmosphere; spring means exerting a force against said diaphragm in a direction tending to close said valve; passage means adapted to connect said control pressure chamber with the enclosure; a second passage means of fixed cross-sectional area adapted to connect said chamber with ambient atmosphere; and pilot valve means, including a differential pressure responsive device, subjected to atmospheric pressure and enclosure pressure on opposite sides thereof for controlling said first passage means.

15. In mechanism for controlling the pressure within an enclosure having an opening to the exterior thereof: enclosure pressure control means operable to control the pressure in said enclosure, including a movable pressure sensitive element, a flow control valve operatively connected to said pressure sensitive element, spring means exerting a pressure against said pressure sensitive element in a direction tending to close said valve, means to connect one side of said pressure sensitive element to atmospheric pressure, and a control chamber on the opposite side of said pressure sensitive element; an outlet passage adapted to connect said control chamber with the exterior of said enclosure; a supply passage adapted to connect said control chamber with the enclosure; and pilot valve means, including a differential pressure responsive device, subjected to atmospheric pressure and enclosure pressure on opposite sides thereof, for controlling said supply passage.

16. Mechanism for controlling the air pressure within an aircraft cabin, supplied with air under pressure and having an air outlet, while permitting a continuous circulation of air through said cabin for ventilation thereof, comprising: means for modulated control of the outflow of air from said air outlet, including a movable pressure sensitive element having an area on one side subjected to ambient atmospheric pressure; walls defining a control pressure chamber, the other side of said pressure sensitive element being subjected to the pressure in said chamber; spring means urging the pressure sensitive element in a direction to effect reduction of airflow through the outlet; outlet passage means, including a fixed bleed orifice, for the flow of air from said control chamber to atmosphere; inlet passage means connecting the cabin with said control chamber for the flow of air from said cabin into said chamber; pilot valve means for controlling the pressure in the control chamber, said pilot valve means including a movable isobaric pilot valve member controlling the flow of air through the inlet passage means; an evacuated bellows having one end fixed and the other end movable and connected to said isobaric pilot valve member, said bellows being responsive to variations of pressure in the cabin for regulating the position of said pilot valve member so that the latter will permit a modulated flow of air through said passage means, which flow is varied in accordance with movements of said movable end of said bellows; a movable differential pilot valve member for controlling the flow of air through the inlet passage means; a spring urging said differential pilot valve member in the closing direction; and differential pressure responsive means connected to the differential pilot valve member, said differential pressure responsive means being subjected on one side to atmospheric pressure and subjected on the opposite side to cabin pressure so that said differential pressure responsive means is responsive to variations of pressure between that in the cabin and atmosphere for regulating the position of said differential pilot valve member so that the latter will permit a modulated flow of air through the inlet passage means, which flow is varied in accordance with movements of said differential pressure responsive means.

17. Mechanism for controlling the air pressure within an airplane cabin, said cabin having an air outlet opening through which ventilation air may flow to the exterior, the combination including: a control pressure chamber; a pressure sensitive diaphragm, one side of said diaphragm being subjected to the pressure in said chamber; a cabin air flow control valve positioned adjacent said outlet opening of said cabin and being movable to control the rate of air flow therethrough, there being means connecting said valve and said diaphragm so that movement of said diaphragm moves said valve into different air flow controlling positions with respect to said outlet opening; wall means defining a space on the side of said diaphragm opposite said control pressure chamber and having an open connection to atmosphere; spring means exerting a force against said diaphragm in a direction tending to close said valve; supply passage means connecting said control pressure chamber with said cabin; a second passage means of fixed cross-sectional area connecting said control pressure chamber with ambient atmosphere; an isobaric control valve in said supply passage means movable into different positions for controlling the amount of air which may flow from said cabin to said control pressure chamber; an isobaric bellows connected to said isobaric control valve, there being means for exposing said isobaric bellows to be responsive to changes in cabin air pressure, said isobaric bellows being connected to said isobaric control valve to move said isobaric control valve when said isobaric bellows expands or contracts; a differential control valve in said supply passage means, said differential control valve being movable into different positions for controlling the amount of air which may flow from said cabin to said control pressure chamber; and differential control means, there being means for exposing one side of said differential control means to cabin air and the other side to atmospheric air, said differential control means being responsive to differentials in pressure between said cabin and atmosphere, said differential control means being connected to said differential control valve to move said differential valve when said differential control means moves.

HOMER J. WOOD.

REFERENCES CITED

The following references are of record in the file of this patent:

UNITED STATES PATENTS

| Number | Name | Date |
|---|---|---|
| 2,208,554 | Price | July 16, 1940 |
| 2,391,197 | Schwein | Dec. 18, 1945 |
| 2,396,116 | Noxon | Mar. 5, 1946 |

FOREIGN PATENTS

| Number | Country | Date |
|---|---|---|
| 521,623 | Great Britain | May 27, 1940 |

Certificate of Correction

Patent No. 2,562,684                                           July 31, 1951

HOMER J. WOOD

It is hereby certified that error appears in the printed specification of the above numbered patent requiring correction as follows:

Column 5, line 1, for "vaves" read *valves*;

and that the said Letters Patent should be read as corrected above, so that the same may conform to the record of the case in the Patent Office.

Signed and sealed this 16th day of October, A. D. 1951.

[SEAL]

THOMAS F. MURPHY,
*Assistant Commissioner of Patents.*